(12) United States Patent
Khermayer

(10) Patent No.: US 11,120,706 B2
(45) Date of Patent: Sep. 14, 2021

(54) GADGET FOR MULTIMEDIA MANAGEMENT OF COMPUTING DEVICES FOR PERSONS WHO ARE BLIND OR VISUALLY IMPAIRED

(71) Applicant: FEELIF, D.O.O., Trzin (SI)

(72) Inventor: Zeljko Khermayer, Domzale (SI)

(73) Assignee: FEELIF, D.O.O., Trzin (SI)

( * ) Notice: Subject to any disclaimer, the term of this patent is extended or adjusted under 35 U.S.C. 154(b) by 336 days.

(21) Appl. No.: 16/099,757

(22) PCT Filed: May 5, 2017

(86) PCT No.: PCT/SI2017/000008
§ 371 (c)(1),
(2) Date: May 1, 2019

(87) PCT Pub. No.: WO2017/196265
PCT Pub. Date: Nov. 16, 2017

(65) Prior Publication Data
US 2020/0118463 A1    Apr. 16, 2020

(30) Foreign Application Priority Data
May 10, 2016   (SI) ................................ P-201600127

(51) Int. Cl.
*G06F 3/01*      (2006.01)
*G09B 21/00*    (2006.01)
(Continued)

(52) U.S. Cl.
CPC ............ *G09B 21/005* (2013.01); *G06F 3/016* (2013.01); *G06F 3/04886* (2013.01);
(Continued)

(58) Field of Classification Search
CPC ....... G06F 3/016; G06F 3/04886; G06F 3/167
See application file for complete search history.

(56) References Cited

U.S. PATENT DOCUMENTS 9,836,143 B1 * 12/2017 Usey ................... G06F 3/0487
10,463,978 B2 * 11/2019 Tran .................... G09B 21/004
(Continued)

OTHER PUBLICATIONS

Rantala J et al: "Methods for Presenting Braille Characters on a Mobile Device with a Touchscreen and Tactile Feedback", IEE Transactions on Haptics, IEEE, USA, vol. 2, No. 1, Jan. 1, 2009 (Jan. 1, 2009), pp. 28-39.

*Primary Examiner* — David E Choi
(74) *Attorney, Agent, or Firm* — The Watson IP Group, PLC; Jovan N. Jovanovic

(57) ABSTRACT

A gadget for a multimedia management of computing devices enables the blind and the visually impaired to use desktop computers, laptops, tablet PCs, handheld PCs, smart phones and all other mobile computing devices which use a screen that is touch sensitive to communicate with users, and that can convert that touch into vibrations of different intensity or frequency. The program background (5) communicates with users by using colored image contents (3), braille characters, vibrations, sounds, music and spoken words. The gadget of the invention is characterized by having a mechanical accessory in the form of a transparent raster mesh (1), which is spread over a classic touchscreen (2) of a computing device (10) and with it, enables spacial orientation for the blind and the visually impaired persons on an otherwise smooth surface of the screen (2), and with it, gives them the possibility to effectively use any modem, serial-made computing device (10) that can express a multi-point touch with vibrations of different strengths and frequencies, while the communication with fingers of the blind user happens through two-dimensional graphic elements (3), composed braille characters in the form of matrix (6) and menu bars (M1, M2, Mx, . . . ).

8 Claims, 1 Drawing Sheet

(51) Int. Cl.
*G06F 3/0488* (2013.01)
*G06F 3/16* (2006.01)

(52) U.S. Cl.
CPC ........... *G06F 3/167* (2013.01); *G09B 21/004* (2013.01); *G09B 21/008* (2013.01); *G06F 2203/04809* (2013.01)

(56) References Cited

U.S. PATENT DOCUMENTS

| | | |
|---|---|---|
| 2010/0055651 A1 | 3/2010 | Rantala et al. |
| 2012/0007809 A1 | 1/2012 | Mahalingam |
| 2015/0024371 A1 | 1/2015 | Mon Pere |
| 2015/0302774 A1 | 10/2015 | Dagar |
| 2016/0378309 A1* | 12/2016 | Chakra ................. G06F 3/0484 715/702 |
| 2017/0116884 A1* | 4/2017 | Choi .................... G06F 3/04886 |
| 2017/0169730 A1* | 6/2017 | Choi .................... G06F 3/04886 |
| 2018/0061275 A1* | 3/2018 | Park ...................... G06F 3/0488 |
| 2018/0260108 A1* | 9/2018 | Hajimusa ............ G06F 3/04886 |
| 2018/0373333 A1* | 12/2018 | Park ...................... G06F 3/0486 |
| 2020/0118463 A1* | 4/2020 | Khermayer ........... G06F 3/0393 |

* cited by examiner

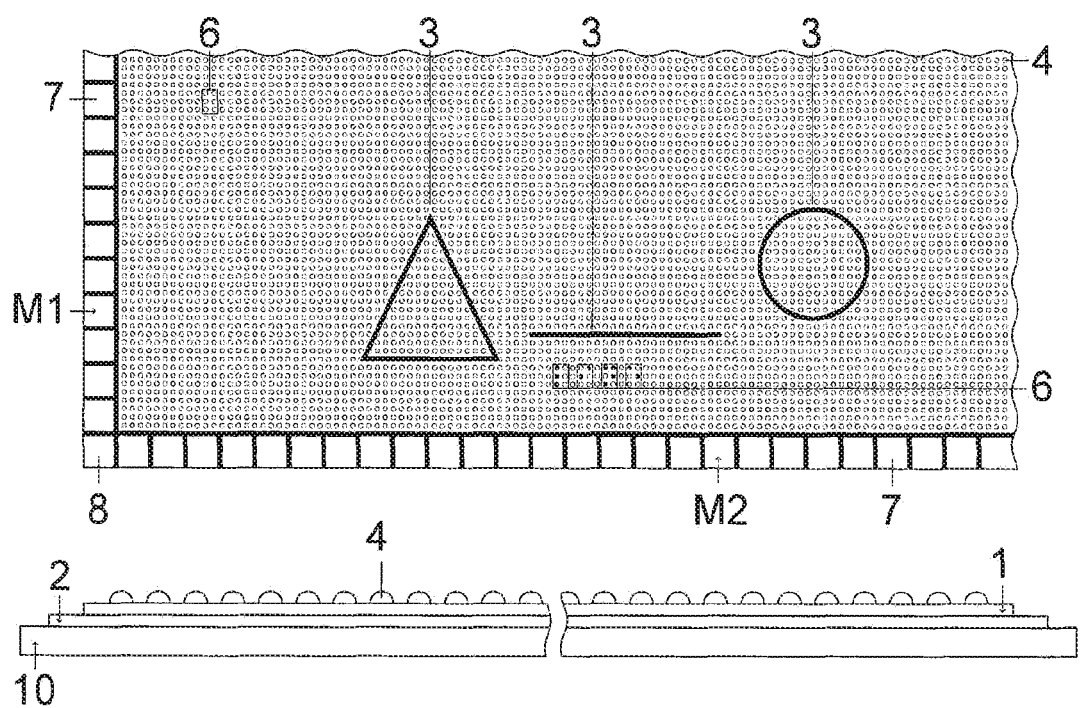

GADGET FOR MULTIMEDIA MANAGEMENT OF COMPUTING DEVICES FOR PERSONS WHO ARE BLIND OR VISUALLY IMPAIRED

OBJECT OF THE INVENTION

The object of the invention is a gadget for a multimedia management of computing devices for persons who are blind or the visually impaired; it is, therefore, a gadget that allows people with partial or complete visual impairment to use any display that is sensitive to touch, known under the English term: touchscreen. The gadget thus offers the blind and the visually impaired a new and innovative way to use the conventional computer input-output units, whose areas for data display also detect the touch of the user's finger and are able to communicate said touch with vibration. The gadget of the invention, together with a suitable computer and a software interface, enables users with visual impairment to directly interact with the graphic elements on the display, which they would otherwise not be able to detect or logically connect into an understandable sequence of data, and thus would not be able to extract the information those elements present.

The gadget of the invention enables the blind and the visually impaired to use desktop computers, laptops, tablet PCs, handheld PCs, smart phones and all other mobile computing devices which use a screen that is touch sensitive to communicate with users, and that can convert that touch into vibrations of different intensity or frequency. With the appropriately adapted software support, the gadget allows the blind and the visually impaired to use computing devices that are intended for people with a healthy vision, i.e. products of large-scale production, that are more affordable due to mass production than specialized devices, while the gadget does not require any interference with the hardware of the computing device.

THE TECHNICAL ISSUE

The modern computer monitors of devices that are sensitive to touch, through graphical user interface software, enable a person with a normal vision to create a two-dimensional picture with characters and elements, through which the user can then logically communicate with the program even without using the mouse and the caret.

A blind person cannot perceive and consequently understand such two-dimensional data fields, because he or she primarily uses their sense of touch to communicate with the environment, which the smooth surface of the screen does not provide. This means that there is no base that a visually impaired person could feel to the touch, through which he or she would then be able to communicate with the data offered by the graphical background software of the modern interfaces, which are designed for people who have a normal vision.

THE KNOWN STATE OF THE TECHNOLOGY

In 1829, Louis Braille invented a special tactile code, which eventually grew into a world-famous relief printing system, used by the blind and the visually impaired to read and write. From then on, the blind can write and read by themselves and are, thus, literate.

Today, the blind can use the so-called braille displays—a computer-aided tool that enables them to communicate faster and gives them a better access to information and communication with the outside world. The braille writing system is based on raised dots with different arrangements. Every braille cell is composed of combinations of six raised dots, arranged in the form of a rectangle. The rectangle has two horizontal dots and three vertical dots. This combination can be arranged into 64 characters, while certain letters are expressed also with the combination of two consecutive braille characters. The same goes for numbers. So every combination of raised dots on the 2×3 matrix has its own meaning for the blind person.

The customized information technology for the blind and the visually impaired, together with the development of communication possibilities, increases the possibility of information independence for people with visual impairment. Blind people cannot help themselves with the simple character enlargement tools, and are dependent on others when it comes to other modes of information transmission. Today, only the use a computer with a braille display and a speech synthesis enables the blind—but not also the visually impaired—to read electronic texts that are written in about the same form as the texts that are read by those who can see. However, such equipment is not easily accessible and it is expensive, because a braille display with a laptop computer costs several thousand euros, and that is without additional, specially adapted software.

What follows are descriptions of the most well-known technologies, even if their use is quite limited in practice:

- A glove with built-in vibrators in different places. The combination of vibrations by these vibrators enables the person to know what the device is telling them. The problem of this solution is that it is costly and cumbersome to use. The user has to put on a glove in order to communicate. A younger a person who is still in the process of growth must often change the gloves into bigger sizes, which presents an additional cost. In addition to that, this technology allows only for one-way communication. This means that through this kind of glove, a person can only read braille, but cannot record it.

- The braille phone that functions according to the EAP concept (Electric Active Plastic) A device for the blind by the manufacturer Samsung is, instead of a visual screen surface, comprised of an electrically-active surface with a smooth plastic coating that temporary bulges in certain places, and by doing so, allows the user to read in accordance with the braille system. The problem with this device is that it is intended only for blind people who understand the braille while it is directly unusable for the family members who can see and thus represents an additional cost. Moreover, the device, as it is presented on the World Wide Web, enables a display of relatively short messages, while the navigation part of the device is fixed and thus only conditionally programmable. The advantage this technology has over the device of the invention is that the user can read a full braille character at a time with the pad of his or her finger, and it is not necessary for the user to read each braille character cell of the 2×3 matrix separately.

- The braille display. With this solution, a special hardware is connected to the computer and the appropriate software, which allows the user to write in braille. It is a large, heavy and expensive device. It does enable reading and writing in braille, but it is conditionally mobile. It is difficult to transfer and during use, the user must sit at the table. In the era of smartphones, this represents a disadvantage, since the user cannot directly use a smartphone, but all of his or her interaction happens via the braille display.

Smartphone braille display. It is a software solution where braille displays on the smartphone screen. When touching a point that is 'raised', the phone vibrates. The problem that this solution has is that the blind person cannot locate where the said point is located. That is why reading braille in this way is practically impossible and it makes this solution useless. This solution also only enables reading the data and not writing.

Converting the text into the Morse code alphabet. It is a software solution where the smartphone software modifies the content of an SMS into vibrations. Vibrations are short and long.

The problem of this solution is that most blind or visually impaired persons do not know the Morse code alphabet. The problem is that this method of communication enables only reading but not writing. The solution represents a relatively limited utilization of the smartphone.

Text-to-speech and speech-to-text conversion. It is a software solution where the smartphone reads the received message and pronounces the text via voice recognition. The problem with this solution is that it is not the most reliable. Conversion of text-to-speech works satisfactorily, but the speech-to-text is problematic. In addition, only the global conversational languages are supported, while with the less widely spoken languages, such as Slovenian, it does not really function well. Another problem is that this solution is very sensitive to the surrounding noise. Therefore, the speech recognition is virtually useless in a noisy environment, i.e. in urban areas. Also, such a solution does not allow for any user privacy, since the user must loudly state the commands and the contents of the message that he/she wants to send.

All relevant patents for touch screens that are intended for people with a healthy vision were made in the 1970's and 1980's and have already expired, so the design and the manufacture of touch screens are no longer limited; they have become very widespread.

One of the solutions is the use of piezoelectric crystals. When touched, the piezoelectric crystals convert the mechanical change into a proportional electric signal. With a touchscreen, at least two strategically positioned piezoelectric crystals are needed, while the location of the touch is determined by comparing the signals and by triangulation. The screen can be made of ordinary glass, which means it is durable and transparent and functions well, despite scratches or dust. The aforementioned technology, together with a processor and corresponding software, then more or less correctly interprets the user's gestures and decides which useful action will be initiated.

There are currently around 18 different touch technologies available. In the past, some were based on visible or infrared light, on sound waves, resistance sensor, mechanical force (Capacitive Technologies, Resistive Technologies, Optical Technologies, Wave Technologies, Force-Sensing Touch Technology). The essence and goal of all these technologies is that upon touch, an electrical impulse is released, which through various media carries out an action that the user wishes to perform. All these technologies have a combination of good and bad qualities in terms of precision, durability, reliability and price.

Today, capacitive technology is mainly used for touch-sensing on the screen, i.e. Samsung Capacitive Technology.

THE SOLUTION OF THE TECHNICAL PROBLEM

The device of the invention is implemented in such a way that it adequately reacts to the touches of those modern touch-screen technologies, which allow for and distinguish a simultaneous multi-point touch, as well as those that detect only a single-point touch on the screen, but also detect the pressure on a certain key of the device. It is the simultaneity of the two signals that the program needs to confirm certain selected actions.

The device of the invention eliminates all the above stated limitations, it is easy to implement on classic affordable devices that are intended for people with a healthy vision, it is easy to use, mobile, enables reading and writing, and in addition to that, it enables the use of the advanced features of smartphones and other comparable devices, including gaming.

The described technical problem is solved by the device of the invention, whose essential characteristic lies in the fact that the mechanical gadget in the form of a raster mesh 1 is spread out over the classical touchscreen 2 of the computing device 10, and by doing so, enables the blind and the visually impaired persons to use any modern, serially produced "touchscreen" device, which can express a multi-point touch with mechanical vibration and/or sound of different intensities or frequencies.

The communication with a blind user is combined; that is, it takes place through two-dimensional graphic elements (shapes) consisting of braille characters 3 and menu bars (M1, M2, Mx, . . . ). The classic approach to reading braille for blind persons is the recognition of uneven surfaces, i.e. protrusions or recesses on otherwise flat and smooth surface of the base, through fingertips, which are, due to the multitude of nerve endings, extremely sensitive to touch.

The essence of the invention novelty lies in the fact that a blind person can, with finger tips, spatially orientate themselves with the help of a raster relief mesh 1, which is placed over the screen 2, while vibrations and/or sound signal from the signal computing gadget 10 notifies the person whether there is or is not a graphic or sign element at a certain location of the touch. The type of the sound also defines what that element is, for example, a line of a certain graphic element 3, a matrix element 6 of an individual braille character, a link to a software tab, a start of a certain programme, a music player or the like.

Merely the movement of the blind person's finger over the smooth display 2 does not ensure the necessary orientation in the two-dimensional space, regardless that the software 5 with sound vibration effects communicates to the user that they have touched a certain visual content with their finger. Spatial orientation is, possible due to the raster mesh 1 of the invention; however, only a combination of the mentioned information creates an adequate idea of the content for the blind person, and that idea is, in accordance with the invention 5, interpreted by the customized software on the screen 2.

Mesh 1 is composed of a one- or multi-layered transparent plate that transmits both visible light from the screen (2) toward the user, as well as the impulses of fingertip touches on the screen 2. For its manufacture, the technology and materials of established toughened glass and foils can be used, which are designed to protect the screens 2 of mobile devices. However, the difference is that the said protective coating on both sides is smooth, while mesh 1 is smooth only on the side that is touching the screen 2, and there is an upgraded, appropriate raster in the form of indentations or preferably pegs 4 on the other side. Mesh 1 is permeable to impulses of fingertip touches against the screen of the device 2 and for the passage of light from the screen toward the user over its entire surface, therefore on the smooth part as well as in places where there are pegs 4 or in the version of the indentation that is not shown here.

The diameter of the peg 4 is from 0.5 mm to 5 mm, preferably 1.5 mm, the distance between individual pegs is from 1 mm to 10 mm, preferably 2.5 mm, and the height of the peg 4 from 0.1 mm to 5 mm, preferably from 0.6 mm to 0.9 mm. Pegs can be of various cross-sections, such as circle, square, triangle, polygon, with a sharp or rounded edge at the top, where there is contact with the fingertip. Pegs 4 are preferably of cylindrical shape with a rounding at the top in the form of a spherical cap, or in the case of lower pegs only in the form of a spherical cap. The form must enable strong enough detection of touch, pegs must be steady and the surface of the mesh 1 and pegs in immediate surroundings of pegs 4 must allow for easy cleaning.

As the standard for reading braille is a peg that the fingertips easily and most accurately detect, the invention uses pegs 4 for the mesh 1. In addition, the thickness of the smooth part of the mesh can remain in the thickness frame of the established protective glass, which is from 0.25 to 0.33 mm, while above this surface there are only lifted pegs, which maintains the mass of the mesh 1 almost unchanged in comparison to the established protective glasses. At the same time; the smooth penetration of the energy impulse from the fingertips against the surface of the screen 2 and its light toward the user is enabled.

The order of pegs 4 is preferably implemented in the form of a square raster, which primarily corresponds to the display of braille, while—at the same time—providing the necessary orientation for the identification of graphic characters. However, on a particular part of the mesh surface 1, the order of pegs 4 may also be circular, wavy, or in any other form which shows the curves easier. Such a system must of course be properly supported by software and the blind user must know that a certain part of the raster is intended for sign communication, and another part for graphic communication.

The communication between the user and the computing device 10 is carried out in the following manner: the user touches a certain point on the screen 2 of the device, which the touchscreen detects, and via a programming interface 5 and the computer 10, it initiates predefined actions such as vibration, speech, sound, music, etc. The raster mesh 1 at the same time enables the blind user to orient where on the screen 2 there is a certain graphic element which triggered an individual action and how can this action or a group of actions that are available on the screen 2 be repeated or combined according to the user's wishes.

The further functionality of the mesh of the invention 1, in combination with software 5, is provided by one or more menu bars (M1, M2, Mx, etc.). Preferably two rows, M1 left and M2 below, are used, located on the edge of the mesh 1. The menu bars are preferably made of rectangles 7, with a sharp or rounded edge, which is raised above the basic surface of the mesh 1 and preferably at the same height as the pegs 4, while the inner space of the rectangle is aligned with the rest of the surface of the mesh 1. The width of the edge ranges from 0.1 mm to 4 mm, preferably from 0.5 to 1 mm. The size of the outer dimensions of the buttons 7 measures from 4×6 mm to 30×45 mm, preferably 6×9 mm for small devices such as smartphones, and preferably 16×24 mm for tablet PCs and similar larger devices. The distance between the buttons 7 is from 0.5 to 50 mm, preferably from 1 mm to 12 mm. Buttons can be freely programmed or with a predetermined functionality. Preferably, the functionality of certain buttons is fixed and intended for basic navigation, such as jumps forward, backward, up, down, next page, previous page, drawing of a line, a rectangle, a square, a triangle, a polygon, a circle, an ellipse, a curve and the like, while certain buttons can be completely free for programming of their functionality according to the individual needs and desires of the user or programmer. When the menu bars M1 and M2 with buttons 7 are arranged in a grid, for example one on the mesh left, the other below, they provide further orientation for the blind user, as the blind user can easily recognize a certain button 7, and then follow the pegs with the finger 4 in a vertical or horizontal direction.

Buttons 7 can have in their central area within the outer edge a fixed stamped relief of a particular braille character, or the sign of an arrow, double arrow, graphic shape (circle, triangle, etc.) in a size and shape that a blind person can recognize. For the buttons 7 with a fixed functionality, a standard of their inner relief visualization and the layout of the menu bar may be set, similarly as it happened with braille, as in this way the portability and usability of new technology is further simplified and speeded up.

Preferably, on the lower left vertex of the mesh 1, at the intersection of the two menu bars M1 and M2, a Ctrl button 8 is located, which is used for action confirmation, stretching and copying of graphic elements, etc.; in short, as similar as possible to the functionality that is implemented in practice for standard applications for computer graphics design.

The customized software 5 of the computing device 10, which is in terms of content-space aligned with the raster of the mesh 1 of the invention, makes it possible to set—for each point on the screen—that whether the computing device 10 will vibrate with vibrations of different strengths and/or emits a sound of different strengths and pitch. A certain action can be set for every point on the screen, such as, for example, the showing of the following image, the initiation of speech, the triggering of sound, music, jumping to the next page, etc. although this is mainly the task of the buttons 7 in the menu bars M1, M2, Mx, etc.

The system of vibration and/or sound response is in terms of software implemented in such a way that the shift of the finger pads over the screen area 2, where there is a graphic element or a point of a braille symbol, triggers a specific response that the blind person recognizes. When the user encounters a graphic element, which usually extends over a relatively large surface of the mesh 1, as a matrix of a braille character 6, the blind user follows the sound emitted by the computer 10, with the travelling of the finger pad along the line of the graphic character 3. The user gets the idea of the graphic design, the contour of which he is following, via the direction of his hand movement. If the audio response is cut off, that is the sign that the user must change the direction of the finger movement and 'catch' the contour again.

For the visually impaired, it is also important that visual display of the software tools can be set, especially the colors and the contrast in the spectrum that said person can best visually perceive.

Software 5, which is available to the blind or the visually impaired users, shows all the graphic and character elements also in the visible form, which means that it can also be used by users without a visual impairment, as the creation of multimedia content is mostly carried out by people with healthy vision, who need visual feedback during content creation. As the information is visual, the introduction of the application of the invention to disabled people is facilitated, since during the first steps of application use, the blind person can be helped by a mentor, teacher, family member or anyone else with a healthy vision.

The software support 5 of the invention is divided into three basic parts:

A content creation program 5a enables design, as well as content viewing and reading. It is intended primarily for specialized technical personnel, engaged in teaching the blind and the visually impaired to be able to create multimedia contents for their education and entertainment. Even though this part of the software is primarily intended for experts, the process of design is sufficiently intuitive and simple that it can be understood and used by family members, who can then help the blind family members in their advancement and thereby strengthen the social and the emotional contact within family or any other creative group. The design program is adapted to allow blind people to prepare specific content by themselves, which enhances their creativity, while sharing their home-made program content over the World Wide Web also enables further connections between the blind and the visually impaired persons.

Content reader Sb is intended for the use of already made program contents, which represents full functionality except for changing, designing and storing multimedia contents.

The platform, or rather the portal Sc for storage, sharing and purchase of content, allows the Web users a free exchange of home-made multimedia contents, as well as the purchase of professionally produced educational contents that have a more complex and copyrighted content. The manner of collection from the portal and the scope of the disposal rights will depend on in which of these two segments an individual designer will choose to place their content. Within the same platform, the information and procurement of services related to personal advice and assistance with the use of individual contents will be enabled.

The raster mesh 1 is preferably self-adhesive and affixed to the screen glass 2 of the computing device 10, and may also be affixed by means of edge trims or in any other way that provides positional stability and immobility of the mesh 1 on the screen 2 during its use. If the mesh 1 is attached, it provides additional mechanical protection of the screen 2 in the case of the fall of the mobile device or during friction with hard objects. If it is removable, it allows the use of the same computing device 10 to visually impaired people as well as users with normal vision who would be bothered by the spillage of light above the pegs 4.

Each braille character 3 is expressed in the form of a matrix 6 of six pegs 4; three in the vertical direction and two in the horizontal. Individual braille characters 3 are arranged horizontally and form a braille line. Each braille line occupies three horizontal lines of pegs 4, and is separated from the following line by a horizontal broken line, consisting of a single line of pegs 4. The same goes for each braille character that is separated from the neighboring one by one line of pegs 4, i.e. three vertical pegs 4.

Graphical elements have different sounds than elements of a braille character. The same goes for broken lines separating each braille line and characters. Individual fields of the matrix of braille characters are also defined by two distinct tones and/or vibration, so that the user can distinguish when they have encountered a bump and when a plane in the matrix, thus being able to know which character (letter, number, etc.) it is.

For the recognition of an individual braille character, a blind person passes with the touch of the finger over all six pegs 4 of the matrix 6, which represents one braille cell. Depending on the vibration emitted by the passage of the finger pads over all six fields of the matrix 6, the user assesses or recognizes which braille character it is. The larger the screen 2, the more pegs it can have 4. The program 5 can then display more braille characters at the same time, thus speeding up and simplifying the reading.

The software 5, running on an individual computing device 10 that is equipped with a touchscreen 2, must exactly match the layout of pegs 4 of the raster mesh 1 and the content and positions of the buttons 7 on the menu bar (M1, M2, Mx, etc.). If a user likes a different layout of the menu bars than is preferentially intended (left and below), this cannot be changed the same way as in virtual graphics applications, and the user must acquire a mesh 1 with a different layout, while the software can provide all possible forms of meshes, which are available on the market, and enables the necessary coordination in its settings.

The mesh of the invention 1, together with an appropriate software 5 and an appropriate computing device 10 with a touchscreen 2 enables at the least the following:

recognition of two-dimensional geometric shapes and simple graphics
reading e-news
reading and writing SMS text messages,
reading and writing e-mails,
phone calls to people from phone directory
overview of the time, battery, memory etc. status,
playing certain simple games, i.e. Tic Tac Toe (3×3), four in a row, battleship and management of similar entertainment programs.

In the menu bars M1, M2, Mx, . . . the corresponding buttons 7 have program titles of various functionalities, i.e. for administrative purposes:

1—NEWS—selected when we wish to read the news.
2—SMS—for writing and reading of short messages.
3—Mail—for writing and reading e-mails.
4—Time—for time and date display.
5—Call—for phone calls.
6—PgDn—the display of the following N signs—one screen.
7—PgUp—the display of the preceding N signs—one screen.
8—END—jump to the end of the text.
9—HOME—jump to the beginning of the text.
10—NEXT—jump to the next entry (with SMS text messages, it is the following message, with e-mails, it is the following e-mail, with news, it is the next news item).
11—PREV—jump to the previous entry.
12—BACK—jump back.
13—OK—confirmation of the entry, or Ctrl 8 button is used to the same effect.

. . . or graphic functions:

1—Plot a square
2—Plot a rectangle
3—Plot a line
4—Plot a curve/wave
5—Plot other kinds of two-dimensional shapes
6—Zoom out/Zoom in
7—Angle
8—Move
9—Copy
10—Rotate
11—Delete . . . .

According to the type and the density of the raster, as well as the content of the menu bar, can the raster meshes 1 be different and adjusted to aims and purposes of the subordinate software 5. However, in such cases they should not be affixed to the screen 2, but be removable and easily replaceable.

The editing of braille is carried out by simply turning on or off the point, which is located below the peg 4 within a braille cell or matrix 6. This is done by holding with one finger a certain surface of the mesh 1 or the peg 4, thus keeping it activated. At the same time a confirmation field or a button, for example button 8, is pressed, or any of the physical buttons of the device 10. Another way to achieve the same effect is a short double tap, or a double-click with the finger pad. The system operates on the principle of power-on, power-off. With different sound frequency and/or intensity of the vibration, the device communicates whether a certain point below the peg 4 of the matrix 6 has turned on or off.

The computer program 5, while reading braille characters, interprets the sound and vibration differently for 'planes' and for 'bumps' during the transition from pads via the peg 4 of the matrix 6, thus letting the blind user know what is under the finger and in what way it enables reading the written word. The same is true for writing. Once the raster field under the peg 4 of matrix 6 is activated (a bump) according to the user's wish, the computing device 10 emits a different tone than when this field is deactivated (a plane).

By varying the frequency of sound or intensity of vibrations, the graphic elements differ from braille characters, as do the braille characters representing the normal text from those that represent a hyperlink or a reference to data that can be directly followed through the confirmation of the string of words. For example, when writing an SMS, the program 5, which runs on the computer 10, displays TXT, which mean that user's text input is expected. Then, once some news is confirmed, the whole news is displayed at any point of the text as a result.

The confirmation of the required selection is performed by simultaneously touching the part of the text of the central braille raster and a specific action button (hidden window), which is in computer jargon referred to as "a click". The part of the text that the user touches can be a full as well as an empty field of a braille cell. In web browsers, the hyperlink typically appears differently from the rest of the text, for example in a different color, font and underlined, while in the software, according to the invention, this is expressed by a different vibration.

An example of e-news reading (not shown):
1. By pressing one of the buttons 7 in the menu bar Mx, the user determines that he/she wants to read the news.
2. News sources are displayed, i.e.: CNN, BBC, Delo etc. Because these are hyperlinks on the Web, the program through the vibrating interface notifies the user that lists of Web (RSS) sources are available, which the user can activate or transfer in full from the web into the device, by pressing on a part of the text in braille with one finger, while with the other, the user presses the checkbox (preferably 8).
3. By simultaneously pressing both of said places, the user chooses a news source. The device, with a specific mode of vibration, communicates to the user that a certain text represents a link to the next content. This means that the user reads the content in the same way as he/she would read a classic text, with the difference being that the device vibrates or produces different sounds during the reading. Therefore, by pressing any point, which is a part of the link text, and by press the confirmation button, it triggers the opening of the following (subordinate) menu option and finally the desired content of the message.
4. Additional addresses are displayed and the search is repeated. This process continues until the desired or offered depth is reached.
5. The content of the news item is displayed, which vibrates differently when touched on the parts of its text.
6. The user can at any time use a different button 7, which represents a jump for a single step back, to the previous level.
7. In the same manner, buttons se Next and Previous, which are per agreement set somewhere in the menu bar, move among separate news items.
8. Buttons (PgDn) and (PgUp), which are also per agreement located somewhere in the menu bar Mx, serve to display the following braille characters, which have not been yet shown on the screen due to lack of space.

An example of SMS text message writing and reading (not shown):
1. By pressing a certain button 7, the user determines that he/she wants to write a text message.
2. Hyperlink "TXT" is displayed. By activating this link, the user can write text.
3. All fields of the central mesh area 1, where braille is displayed, are set to value zero.
4. The user moves to the first braille cell and by select activation of certain fields of the braille matrix, the user forms the desired character. The written text can be promptly checked and corrected.
5. When all characters on the screen have been filled, a push on the confirmation button moves the text to the next page, where there is another 'empty' screen available.
6. When the user has completed the text entry, he/she pressed the button "Complete" and by doing so, confirms the text entry.
7. Program 5 offers the user the pre-prepared choices >>Number<<, >>Contacts<< and "Search".
   Choosing "Number" enables the entry of number with braille characters, "Contacts" displays contacts menu, and "Search" stands for contact menu search. The goal of all three options is to get the phone number where the SMS text message will be sent.
8. After the user has selected and confirmed the desired phone number, the program sends the SMS text message.

Example of graphic element drawing (not shown):
1. By pressing a button 7, the user selects a character, for example a rectangle.
2. He or she places the finger pad on a specific part of the mesh raster 1, locates the starting position of the future character 3, then starts the process of design with a double tap, pulls the finger diagonally over the mesh 1, and then removes it, which commands the program 5 that it should draw the desired character between the starting (double-tap) and the final (deviation) point.

The essence of the invention is explained in detail in the description of an implemented example regarding the accompanying drawings which display the following:

FIG. 1 The plan view and side view of the mesh 1 of the invention with labels of geometric figures 3, menu bars M1 and M2 with programmable buttons 7 and braille characters in the form of the matrix 6, which screen 2 of the device 10 pictorially interprets through the light-permeable mesh 1.

The components of the invention shown in FIG. 1 are as follows:
- 1 transparent mesh of the invention, which enables the transfer of energy of the touching finger.
- 2 screen of the computing device 10
- 3 two-dimensional graphic shape (circle, triangle, line, etc.).
- 4 peg, arranged in the raster, which preferably covers the central part of the mesh 1
- 5 software (not shown).
- 6 matrix of a braille cell comprising 2×3 pegs 4
- 7 button of the menu bars M1, M2, Mx, etc.
- 8 Ctrl button—a control button.
- 10 computing device.
- M1 menu bar, preferably on the left edge with the preferably programmable buttons 7
- M2 menu bar, preferably on the bottom edge with a preferably predetermined functionality of buttons 7.

In the description of the invention for braille, the following names are used:
- A braille cell is an equivalent of a braille character, that is, a letter or a number, therefore a rectangular matrix 6, size 2×3, that is six bumps, holes or plains of the physical, that is, paper or other braille code.
- A raster field is an equivalent to an individual bump, hole or plain of the physical, that is, paper or other braille code. In the mesh 1 of the invention, an individual raster field is illustrated by an individual peg 4.

It is understood that technical implementation, as well as details of the design, fastening of the raster mesh 1 of the invention, and especially the software approach are somewhat different from those described above, which, however, does not alter the fundamental characteristics and features of the invention.

It is understood that the raster mesh 1 can be fastened onto the screen of the computing device 2 also so that both devices are subsequently inseparably connected, or so that already during the process of manufacturing of the display of electronic device 10, an appropriate relief along the lines of the mesh 1 is created instead of the smooth outer layer of the screen, which does not alter the fundamental characteristics and features of the invention.

It is understood that an expert in this field can, based on the knowledge of the invention, design implementation cases that are slightly different from the above described, without thereby bypassing the basic characteristics of the invention as defined by the patent claims.

The invention claimed is:

1. A gadget for multimedia operating of computing devices for the blind and visually impaired, characterized by being a mechanical accessory in the form of a raster mesh (1) which is spread out over a classical touch screen device (2), thus enabling the blind and visually impaired people spatial orientation on the otherwise smooth surface of the screen and hence the possibility of effective use of any type of modern serial device, which is able to express by touch a vibration of different intensity and the multipoint touch by the vibration of different intensity and/or frequency, the communication with the blind or visually impaired users proceeds via composite braille characters, in the form of a spatial matrix, size 2×3 (6), two-dimensional graphic elements (3), the menu bars (M1, M2, Mx) or their corresponding buttons (7) and the confirmation or control button (8).

2. Accessory according to claim 1, characterized by that the size and rater mesh (1) are adapted to gauges of an individual electronic computing device (10), this raster is always supported by the appropriate software (5), which enables the braille characters, graphic elements (3) and the menu buttons (7) on the screen to exactly coincide.

3. Accessory according to claims, characterized by that the mesh (1) that has a smooth surface, with its raster structure divides the display of the computer device (2) into independent smaller parts, thereby providing a blind person spatial orientation in a two-dimensional space on the touch screen.

4. Accessory according to claims 1 to 3, characterized by that PCT/S12017/000008 the mesh (1) is composed of one or multi-layered transparent plate, preferably of protective glasses of standard thickness (0.25 to 0.33) that transmits both visible light from the screen (2) toward the user, as well as impulses of touching fingertips toward the screen (2), for its production, the technology and materials of established toughened glass and foil can be used, which are designed to protect the screens (2) of mobile devices, however, the difference is that the said protective coating on both sides is smooth, while the mesh (1) is smooth only on the side that is touching the screen (2), and there is an upgraded appropriate raster in the form of indentations or preferably pegs (4) on the other side.

5. Accessory according to claims 1 to 4, characterized by that the diameter of the peg (4) is from 0.5 mm to 5 mm, preferably 1.5 mm, the distance between individual pegs is from 1 mm to 10 mm, preferably 2.5 mm, and the height of the peg 4 from 0.1 mm to 5 mm, preferably from 0.6 mm to 0.9 mm, pegs can be of various cross-sections, such as circle, square, triangle, polygon, with a sharp or rounded edge at the top, where there is contact with the fingertip, pegs (4) are preferably of cylindrical shape with a rounding at the top in the form of a spherical cap, or in the case of lower pegs only in the form of a spherical cap, the form must enable strong enough detection of touch, pegs must be steady and the surface of the mesh 1 and pegs in immediate surroundings of pegs 4 must allow easy cleaning.

6. Accessory according to claim 5, characterized by that the order of pegs (4) is preferably implemented in the form of a square raster, which primarily corresponds to the display of braille, while at the same time providing the necessary orientation for the identification of graphic characters, however, on a particular part of the mesh surface (1), the order of pegs (4) may also be circular, wavy, PCT/S12017/000008 or any other form which shows the curve easier.

7. Accessory according to one of preliminary claims, characterized by that further functionality of the mesh of the invention (1), in combination with software (5), is provided by one or more menu bars (M1, M2, Mx), preferably made of buttons in the shape of rectangles (7), with a sharp or rounded edge, which is raised above the basic surface of the mesh (1) and preferably at the same height as the pegs (4), while the inner space of the rectangle is aligned with the rest of the surface of the mesh (1), the width of the edge ranges from 0.1 mm to 4 mm, preferably from 0.5 to 1 mm, the size of the outer dimensions of the buttons (7) measures from 4×6 mm to 30×45 mm, preferably 6×9 mm for small devices such as smartphones, and preferably 16×24 mm for tablet PCs and similar larger devices, the distance between the buttons (7) is from 0.5 to 50 mm, preferably from 1 mm to 12 mm, buttons can be freely programmed or with a predetermined functionality and in their inner surface according to the intended use appropriately marked with braille characters or some other predetermined recognizable reliefs.

8. Accessory according to one of preliminary claims, characterized by that the menu bars are preferably two (M1 and M2), arranged in a grid of the mesh (1), one on the upright left, the other horizontally below, which provides further orientation for the user, as a certain button (7) is easily recognizable, so that the user puts the finger on it and then follows the pegs with the finger (4) in a vertical or horizontal direction, at the same time there is, preferably on the juncture of the two menu bars M1 and M2, on the lower left vertex of the mesh (7), a control-confirmation button (8), which is used for confirmation of actions, stretching and copying of graphic elements, etc.; in short, similar to functionality that is implemented in practice for standard applications of computer graphics design.

\* \* \* \* \*